United States Patent [19]
Ueki Hiroshi et al.

[11] Patent Number: 5,269,606
[45] Date of Patent: Dec. 14, 1993

[54] SHELLED LINEAR MOTION GUIDE UNIT

[75] Inventors: Ueki Hiroshi, Ebina; Shinobu Shimmyo, Sakai, both of Japan

[73] Assignee: Nippon Thompson Co., Ltd.

[21] Appl. No.: 882,381

[22] Filed: May 13, 1992

[30] Foreign Application Priority Data

May 14, 1991 [JP] Japan .................................. 3-138405

[51] Int. Cl.[5] ......................................... F16C 29/04
[52] U.S. Cl. ........................................ 384/49; 384/59
[58] Field of Search .................. 384/49, 59, 55, 57, 384/21, 47, 45

[56] References Cited

U.S. PATENT DOCUMENTS

| | | | |
|---|---|---|---|
| 3,897,119 | 7/1975 | McMurtrie | 384/55 |
| 4,699,521 | 10/1987 | Yokota | 384/59 |
| 4,701,058 | 10/1987 | Mottate | 384/49 |
| 5,134,670 | 7/1992 | Kamimura | 384/49 |

*Primary Examiner*—Lenard A. Footland
*Attorney, Agent, or Firm*—Skjerven, Morrill, MacPherson, Franklin & Friel

[57] ABSTRACT

A finite stroke type linear motion rolling contact guide unit includes a rail, a table, a plurality of rolling members interposed between the rail and the table, a retainer means for retaining the rolling members in position, an upper outer shell block having a bottom recess at its bottom surface for receiving therein the table as fixedly attached thereto and a lower outer shell block having a top recess at its top surface for receiving therein the rail as fixedly attached thereto. The blocks are provided with mounting holes for attachment to desired objects and preferably with a stopper mechanism.

6 Claims, 4 Drawing Sheets

SHELLED LINEAR MOTION GUIDE UNIT

BACKGROUND OF THE INVENTION

1. Field of the Invention

The present invention generally relates to a linear motion guide unit, and, in particular, to a finite linear motion rolling contact guide unit which is enclosed in a shell.

2. Description of the Prior Art

A finite linear motion rolling contact guide unit is well known in the art, and its typical prior art example is shown in FIGS. 5 through 7 and another typical prior art example is shown in FIG. 8. A finite linear motion rolling contact guide unit generally includes a rail, a table slidably mounted on the rail, a plurality of rolling members interposed between the rail and the table and a retainer for retaining the rolling members in position. With this structure, a relative linear motion can be provided between the rail and the table over a predetermined distance.

The linear motion guide unit shown in FIGS. 5 through 7 include a rail 21 elongated and generally rectangular in shape and typically comprised of aluminum and a table 22 which is generally U-shaped in cross section, including a horizonal section and a pair of vertical sections depending from the opposite sides of the horizonal section, and typically comprised of aluminum. As best shown in FIG. 6, an inner guide groove generally rectangular in cross section is formed at each side surface of the rail 21 and an outer guide groove generally rectangular in cross section is also formed at each side surface of each of the vertical sections of the table 22 in an opposed relationship with its associated inner guide groove to thereby define a guide channel 23 extending in parallel with the longitudinal axis of the guide unit. Thus, the guide unit is provided with a pair of guide channels 23 on the opposite sides of the rail 21, and each of the guide channels 23 has a generally rectangular cross section.

In each of the guide channels 23 are provided with a plurality of rolling members (balls in the illustrated example) 25 and also with a plate-shaped retainer 24 formed with a plurality of holes spaced apart from each other for retaining therein the balls 25 in a specific spaced apart relationship. Also provided in each of the guide channels 23 are four guide steel wires 26, two of which are located at the top and bottom corners of the inner guide groove and the remaining two of which are located at the top and bottom corners of the associated outer guide groove. Thus, as best shown in FIG. 6, the balls 25 are in rolling contact with these guide wires 26 so that a rolling contact is provided between the rail 21 and the table 22.

Also provided in the prior art guide unit shown in FIGS. 5 through 7 is a preload adjusting mechanism 27 which generally includes a pressure plate and associated screws which may be turned to move inward or outward to adjust the location of the pressure plate to thereby adjust the preloading state of the balls 25.

The above-described prior art is disadvantageous in many respect, though the rail 21 and the table 22 themselves are relatively rigid in structure because they are made from solid blocks by machining them. For example, since the rolling contact is provided between the balls 25 and the wires 26, its load bearing capability is rather limited. In addition, since the number of elements is relatively large, it is rather complicated and thus expensive to manufacture.

FIG. 8 illustrates another typical prior art linear motion guide unit. As shown, this prior art guide unit includes a generally U-shaped rail 28, a generally U-shaped table 29, a plurality of rolling members or balls 31 and a retainer 30 for retaining the balls 31 in position. In this guide unit, both of the rail 28 and the table 29 are fabricated from a relatively thin sheet metal, such as a steel plate, by bending into a predetermined shape having a generally U-shaped cross section, and the table 29 thus fabricated is turned upside down and placed onto the rail 28 which is held right side up with its open top side facing upward.

Also in this guide unit, an inner guide groove is formed in each of the outer side surfaces of the rail 28 and an outer guide groove is formed in each of the inner side surfaces of the table 29 in an opposed relationship to thereby define a guide channel in which the balls 31 and the retainer 30 are disposed. In this case, the balls 31 are in rolling contact with both of the inner and outer guide grooves to provide a rolling contact between the rail 28 and the table 29. Such a structure is possible in this guide unit since the guide grooves can be defined relatively at high accuracy for example by press forming at the time when the rail 28 and the table 29 are fabricated.

In the above-described second prior art guide unit, since the balls 31 are in rolling contact with the inner and outer guide grooves directly, a relatively large load bearing capability can be provided. In addition, since both of the rail 28 and the table 29 are fabricated from a thin metal plate, for example, by bending or press forming, they can be fabricated relatively easily and at low cost. In addition, the overall size and weight of the guide unit can be made much smaller. However, since both of the rail 28 and the table 19 are made from a thin metal plate, they are subject to distortions so that they present limitations in the load bearing capability. Moreover, since the rail 28 and the table 29 are relatively thin, mounting holes provided in them are very shallow so that difficulty is often encountered in mounting the rail 28 and the table 29 to appropriate objects, such as a frame or a moving component of an apparatus.

SUMMARY OF THE INVENTION

In accordance with the present invention, there is provided an improved linear motion guide unit comprising: a rail of a relatively thin metal plate bent to have a generally U-shaped cross section; a table of a relatively thin metal plate also bent to have a generally U-shaped cross section, said table being turned upside down with respect to said rail; a plurality of rolling members interposed between the rail and the table; a retainer plate for retaining the rolling members in position; an upper outer shell block having a bottom recess for receiving therein said table as fixedly attached thereto at its bottom surface; and a lower outer shell block having top recess for receiving therein said rail as fixedly attached thereto at its top surface which is located opposite to said bottom surface with a predetermined gap therebetween.

With this structure, since the rail and the table are fabricated from a relatively thin metal plate, they can be fabricated easily and compact in size, and yet the rail and the table are fixedly attached to respective shell blocks in a substantially enclosed manner, their integrity is significantly increased so that the overall load bearing capability is significantly enhanced.

It is therefore a primary object of the present invention is to obviate the disadvantages of the prior art as described above and to provide an improved linear motion guide unit.

Another object of the present invention is to provide an improved finite stroke type linear motion rolling contact guide unit compact in size, high in load bearing capability and low at cost.

A further object of the present invention is to provide an improved finite stroke type linear motion rolling contact guide unit reliable and smooth in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
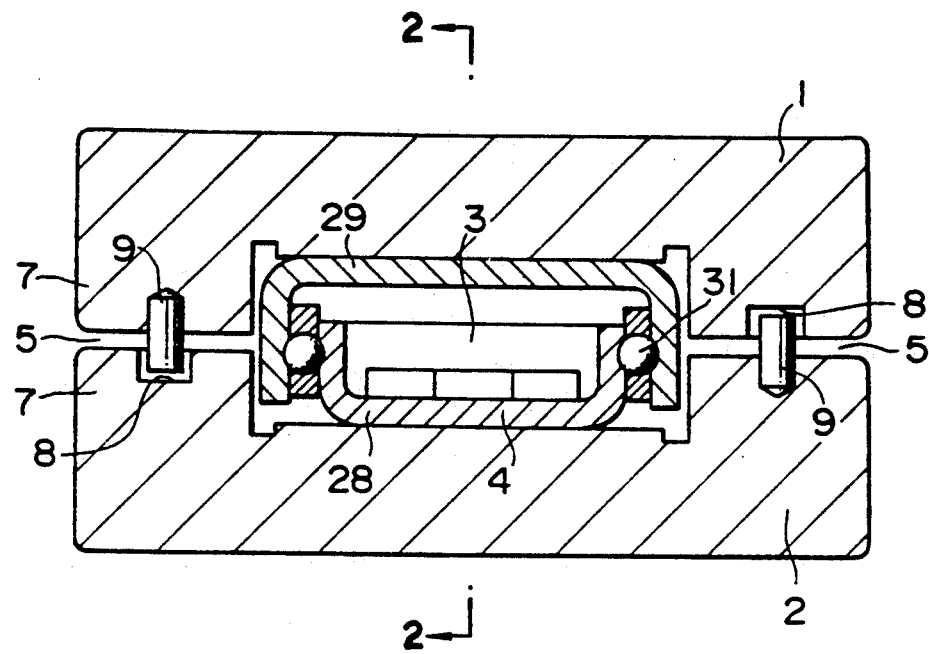
FIG. 1 is a schematic illustration showing in transverse cross section a finite stroke type linear motion rolling contact guide unit constructed in accordance with one embodiment of the present invention.
Figure 2:
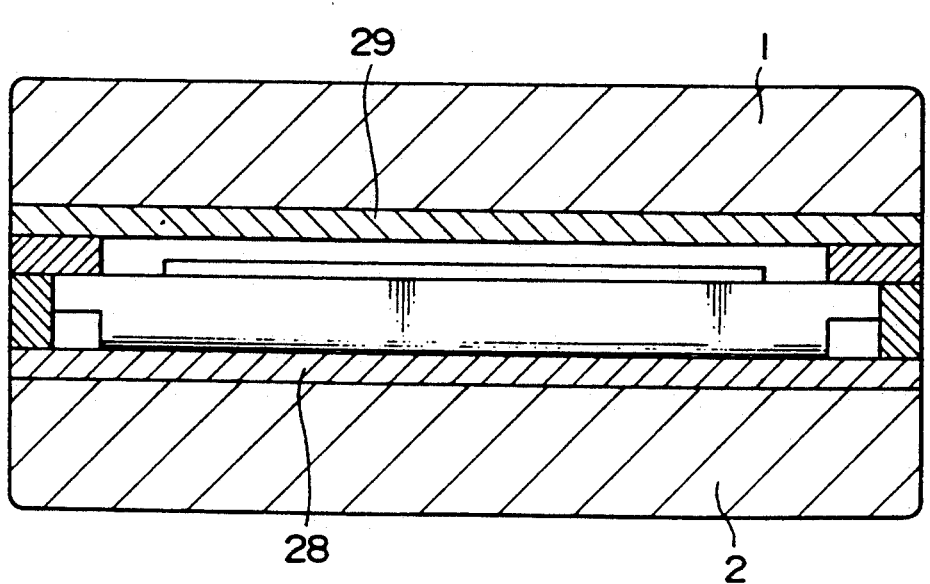
FIG. 2 is a schematic illustration showing in longitudinal cross section of the guide unit shown in FIG. 1 taken along line 2-2 indicated in FIG. 1.

Referring now to FIG. 1, there is schematically shown a finite stroke type linear motion rolling contact guide unit constructed in accordance with one embodiment of the present invention. As shown, the present guide unit includes a rail 28 of a relatively thin metal (e.g., steel) plate which has been bent into a desired shape to have a generally U-shaped cross section, and, thus, the rail 28 includes a horizontal section and a pair of side sections extending vertically from the opposite sides of the horizontal section. In the illustrated embodiment, an inner guide groove is formed at the outer side surface of each of the side sections.

The guide unit also includes a table 29 of a relatively thin metal (e.g., steel) plate which has been bend into a desired shape to have a generally U-shaped cross section, and, thus, similarly, the table 29 also includes a horizontal section and a pair of side sections extending vertically from the opposite sides of the horizontal section. However, the table 29 is turned upside down so that its open side is located at its bottom facing the open top side of the rail 28. In the illustrated embodiment, since the table 29 has a horizontal section which is wider than the horizontal section of the rail 28, the side sections of the table 29 are located outside of the side sections of the rail 28. Alternatively, the table 29 may have a narrower horizontal sections so that its side sections are located inside the side sections of the rail 28. In any event, since the table 29 is turned upside down and placed in an opposed relationship with the rail 28, a central hollow space 3 is defined between the rail 28 and the table 29.

In the illustrated embodiment, an outer guide groove is formed in the inner surface of each of the side sections of the table 29 in an opposed relationship with an associated one of the inner guide grooves formed in the rail 28, so that a guide channel is defined by a pair of opposed inner and outer guide grooves for receiving therein a plurality of balls 31 as rolling members. Also provided in the guide channel is a retainer plate which is elongated in shape and formed with a plurality of holes for receiving therein the balls in a spaced apart relationship. As a result, a rolling contact is established between the rail 28 and the table 29 when assembled so that a relative linear motion can be provided between the rail 28 and the table 29 over a predetermined stroke or distance. Thus, the rail 28, table 29, balls 31 and the retainer plates define a main structure 4 of the present guide unit.

The present guide unit also includes an upper outer shell block 1 having a relatively large thickness as compared with that of the rail 28 and the table 29. The block 1 may be comprised of any desired material, such as aluminum, light weight alloys, and plastics. The block 1 is formed with a bottom recess which is rectangular in cross section in the present embodiment, and the table 29 is placed inside the bottom recess and fixedly attached to the block 1, for example, by means of fixing means, such as bolts. Since the bottom recess is formed in the central region of the bottom surface, the block 1 has a generally U-shaped cross section which is turned upside down. The peripheral region of the bottom surface of the block 1 surrounding the bottom recess is horizontal and flat in the present embodiment.

In addition, the present guide unit also includes a lower outer shell block 2 which also has a relatively large thickness and which may be comprised of the same material as that of the upper block 1. In a preferred embodiment as shown in FIG. 1, the lower block 2 is identical in shape and material to the upper block 1, excepting the only difference of the upper block 1 being turned upside down. Thus, the lower block 2 is formed with a top recess at a central region of the top surface thereof, and the rail 28 is placed in and fixedly attached to the lower block 2. The peripheral region of the top surface of the lower block 2 which surrounds the top recess is also horizontal and flat. It is to be noted, however, that the peripheral bottom surface region of the upper block 1 is in an opposed relationship with the peripheral top surface region of the lower block 2 with a predetermined gap 5 set therebetween. Thus, in normal condition, there is no physical contact between the upper and lower blocks 1 and 2.

Figure 3:
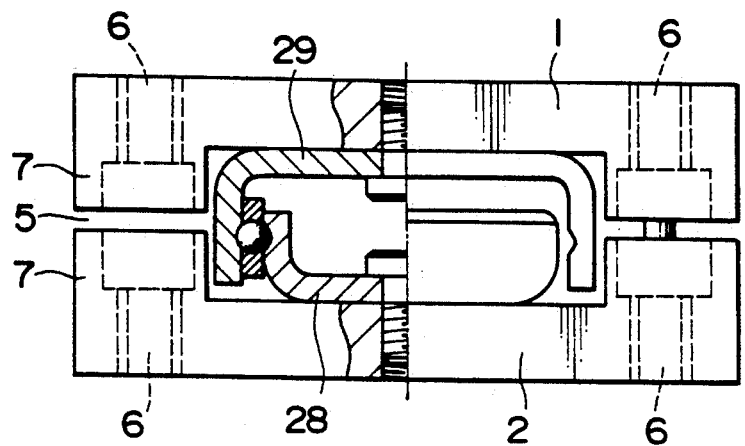
FIG. 3 is a schematic illustration showing partly in transverse cross section a modification of the guide unit shown in FIG. 1.

As best shown in FIG. 3, each of the upper and lower blocks 1 and 2 has a thicker side section 7 in which one or more mounting holes 6 are provided. Thus, the upper and lower blocks 1 and 2 may be bolted to any desired objects, such as a frame or a moving part of an apparatus, respectively. In FIG. 3, it is shown that the rail 28 and the table 29 are bolted to the lower and upper blocks 2 and 1, respectively.

Figure 4:
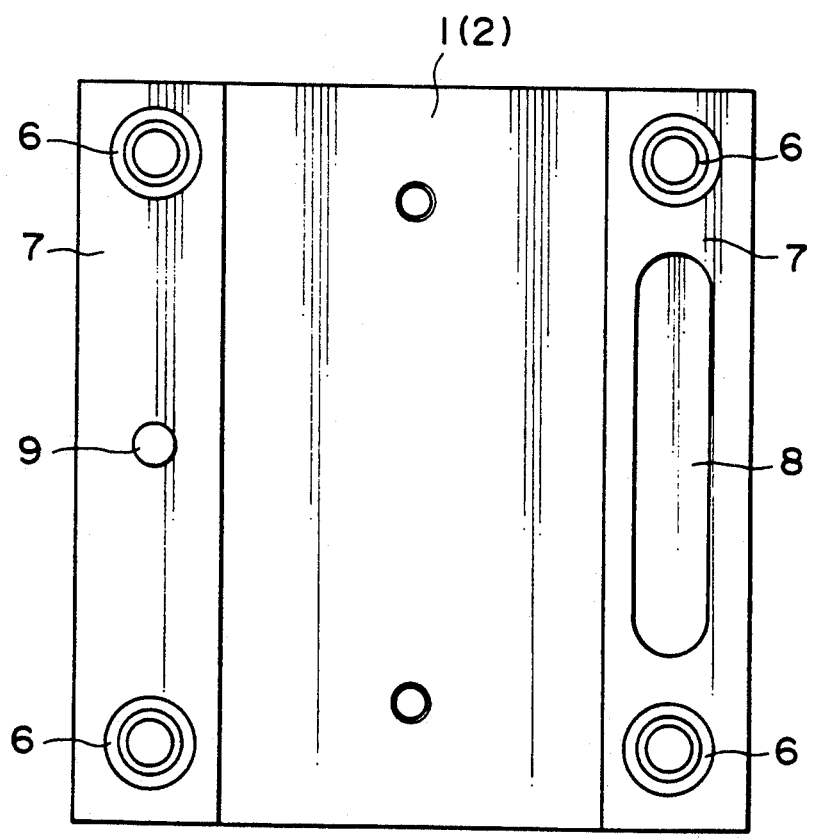
FIG. 4 is a schematic illustration showing in plan view either of the upper or lower outer shell block employed in the guide unit shown in FIGS. 1 through 3.
Figure 5:
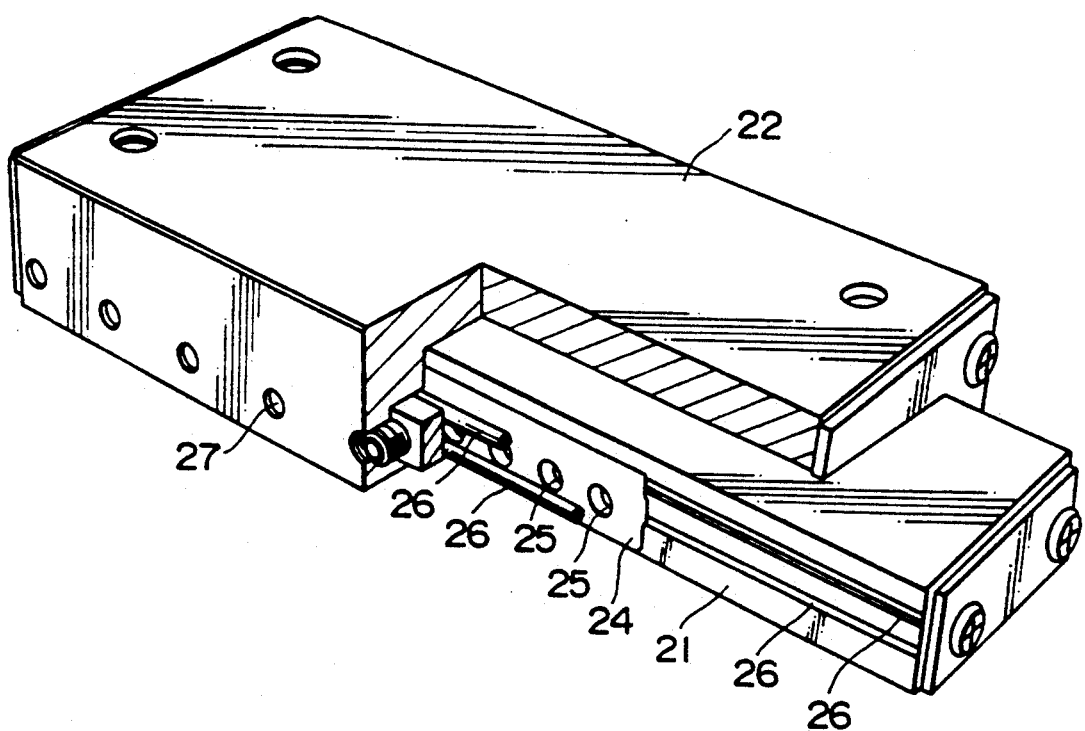
FIG. 5 is a schematic illustration showing in perspective view a typical prior art finite stroke type linear motion rolling contact guide unit using metal blocks.
Figure 6:
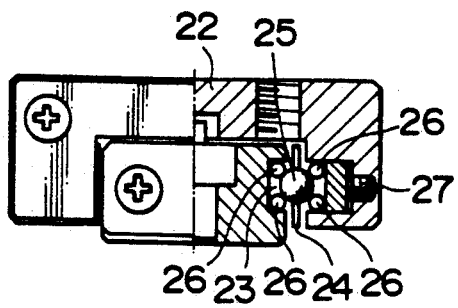
FIG. 6 is a schematic illustration showing in transverse cross section in its right-hand half the prior art guide unit shown in FIG. 5.
Figure 7:
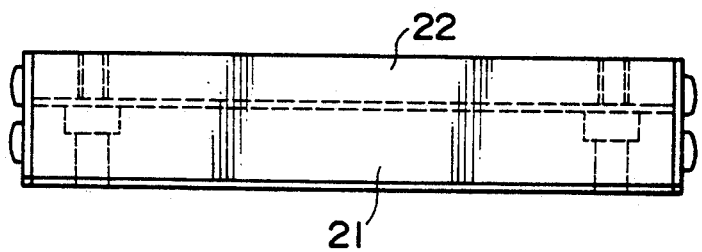
FIG. 7 is a schematic illustration showing in side elevation the prior art guide unit shown in FIG. 5.
Figure 8:
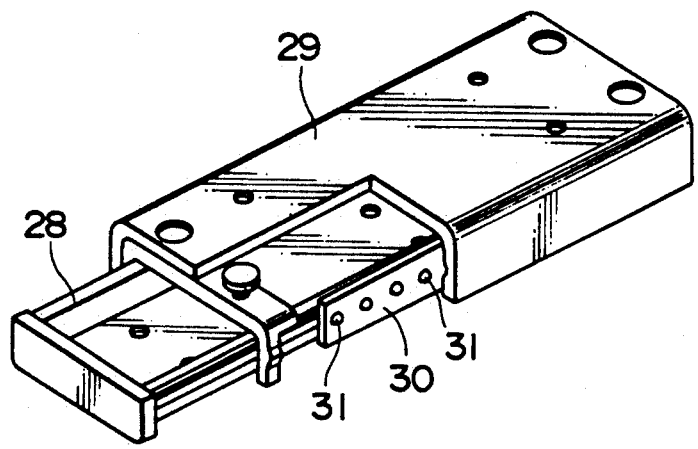
FIG. 8 is a schematic illustration showing in perspective view another typical prior art finite stroke type linear motion rolling contact guide unit using relatively thin metal plates.

As best shown in FIG. 4, an elongated slot 8 is formed in the bottom surface of the right-hand side section 7 extending over a substantial length and a stopper pin 9 is planted in the bottom surface of the left-hand side section 7 at the center thereof. Thus, when the upper block 1 is turned upside down and placed in an opposed relationship with the lower block 2 in a right side up orientation, the stopper pin 9 of the upper block 1 is located inside the slot 8 of the lower block 2, and, similarly, the stopper pin 9 of the lower block 2 is located inside the slot 8 of the upper block 1. As a result, the extreme limits of a relative motion between the rail 28 (and thus the lower block 2) and the table 29 (and thus the upper block 1) are determined through an engagement between the pin 9 and the ends of an associated slot 8. FIG. 3 shows the case in which only one stopper pin is used. Such a structure is particularly advantageous since it is not necessary to provide a stopper mechanism in the main body 4.

While the above provides a full and complete disclosure of the preferred embodiments of the present invention, various modifications, alternate constructions and equivalents may be made without departing from the true spirit and scope of the invention which is defined by the appended claims.

What is claimed is:

1. A linear motion guide unit comprising:
    a rail of a relatively thin metal plate bent to have a generally U-shaped cross section;
    a table of a relatively thin metal plate also bent to have a generally U-shaped cross section, said table being turned upside down with respect to said rail;
    a plurality of rolling members interposed between the rail and the table;
    a retainer means for retaining the rolling members in position;
    an upper outer shell block having a bottom recess for receiving therein said table as fixedly attached thereto at its bottom surface; and
    a lower outer shell block having a top recess for receiving therein said rail as fixedly attached thereto at its top surface which is located opposite to said bottom surface with a predetermined gap therebetween.

2. The guide unit of claim 1, wherein each of said upper and lower blocks has a thickness which is substantially larger than the thickness of said metal plate.

3. The guide unit of claim 1, wherein said upper and lower blocks are identical in structure excepting their orientation.

4. The guide unit of claim 3, wherein each of said upper and lower blocks has a generally U-shaped cross section, including a horizontal section and a pair of side sections extending vertically from the opposite sides of the horizontal section, and said guide unit further comprising stopper means interposed between said upper and lower blocks for limiting an extent of relative linear motion between said upper and lower blocks.

5. The guide unit of claim 4, wherein said stopper means includes an elongated slot formed in an end surface of one of said side sections and a stopper pin planted in an end surface of the other of said side sections.

6. The guide unit of claim 1, wherein each of said upper and lower blocks is formed with at least one mounting hole for mounting said blocks to desired objects fixedly.

* * * * *